July 28, 1925.
L. D. WOODRUFF
1,547,483
DOUBLE PIVOTED BALL JOINT
Filed April 11, 1924
2 Sheets-Sheet 1
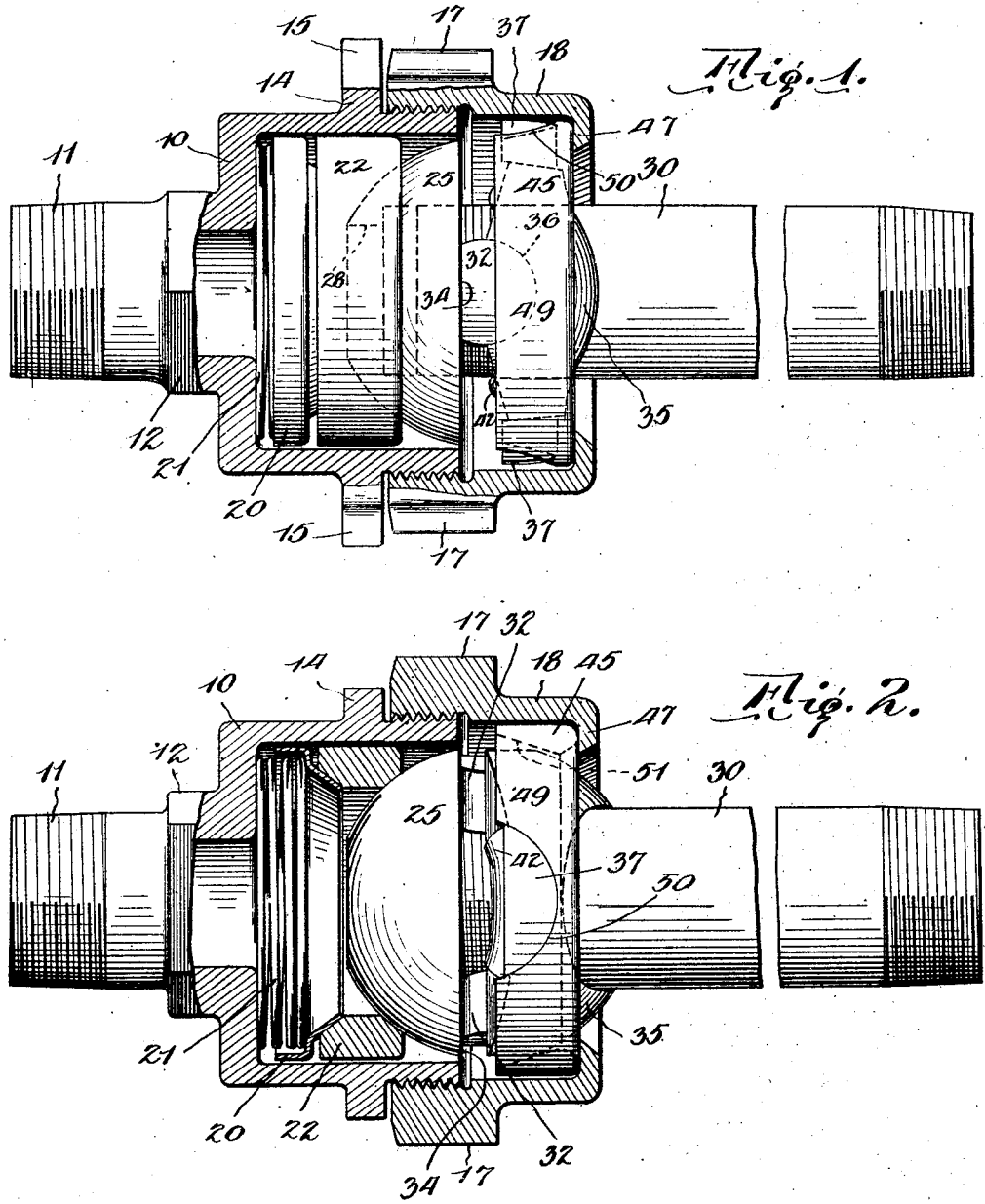
Inventor,
Leonidas D. Woodruff.
By Church & Church
His Attorneys July 28, 1925. 1,547,483
L. D. WOODRUFF
DOUBLE PIVOTED BALL JOINT
Filed April 11, 1924  2 Sheets-Sheet 2
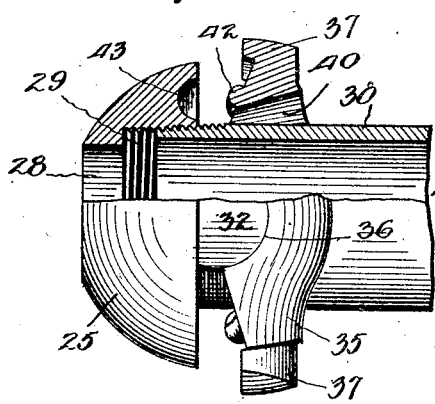
Fig. 3.
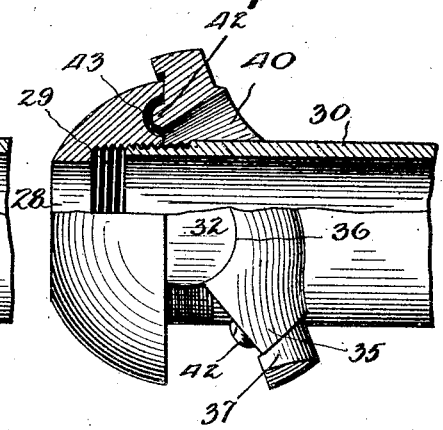
Fig. 4.
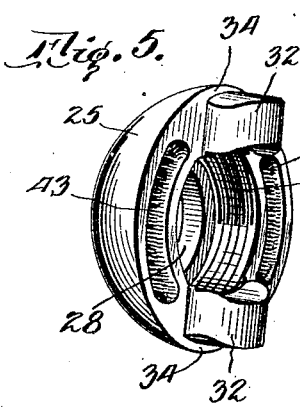
Fig. 5.
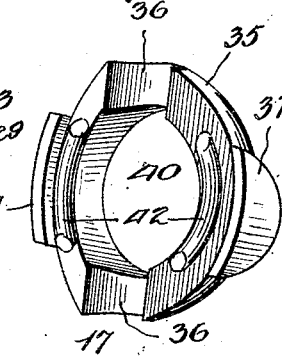
Fig. 6.
Fig. 7.
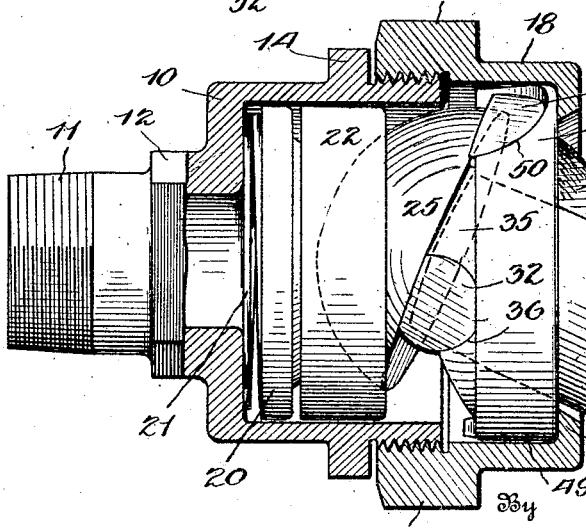
Fig. 8.
Inventor
Leonidas D. Woodruff
By Church & Church
His Attorneys Patented July 28, 1925.

1,547,483

UNITED STATES PATENT OFFICE.

LEONIDAS D. WOODRUFF, OF CHICAGO, ILLINOIS.

DOUBLE-PIVOTED BALL JOINT.

Application filed April 11, 1924. Serial No. 705,852.

*To all whom it may concern:*

Be it known that I, LEONIDAS D. WOODRUFF, a citizen of the United States, residing at Chicago, in the county of Cook and State of Illinois, have invented certain new and useful Improvements in Double-Pivoted Ball Joints; and I do hereby declare the following to be a full, clear, and exact description of the same, reference being had to the accompanying drawings, forming part of this specification.

This invention relates to ball joints and has for its principal object the improvement generally of such devices.

An important feature of the present invention lies in the provision of a flexible joint primarily intended for car service in which the amount of permissible movement is a maximum for the size of the joint and in which the parts may wear a very appreciable amount without appreciable lowering of the efficiency of the joint. A further object of the invention lies in the provision of a joint of exceptionally sturdy and rugged character and in which access to the parts may be had by unscrewing a single joint.

In the drawings,—

Figure 1 is a side view partly in central cross section of my joint.

Fig. 2 is a similar view taken at right angles to the view shown in Fig. 1.

Figs. 3 and 4 show the assembly of pipe, ball, and cradle in different positions.

Fig. 5 is a perspective of the ball.

Fig. 6 is a perspective of the cradle.

Fig. 7 is a perspective of the swiveling ring.

Fig. 8 is an assembly showing the parts in twisted relation but otherwise quite similar to the showing of Fig. 1.

The joint, except for the ball, cradle, and swiveling ring assembly, is of well known construction. The fitting 10 which forms the major part of the casing has the usual threaded nipple 11, integral hexagon nut 12, and flange 14, the latter having the customary diametrically extended lugs 15 which are pierced to permit passage of the cotter pins (not shown) which pass between adjacent lugs 17 on the sleeve 18, often called the cap, and which forms the second half of the casing. All the parts so far described are quite old. The anti-vibration ring 20 is also of well known construction although only invented a few years ago. This ring 20 is pressed by the spring 21 against the gasket 22 which engages the ball 25 the latter being of new design. The anti-vibration ring 20 has found great success in the art, its function being, among other things, to prevent damage to the upper corner of the gasket under certain stresses. By its use the life of the gasket is greatly increased.

The ball 25 is a zone-shaped piece of metal quite a bit less than a semi-sphere. It is centrally pierced as at 28 for the passage of fluid and is threaded as at 29 for the reception of a pipe 30 which in other forms of ball joints is integral with the ball and is commonly referred to as the neck. The ball or semi-ball 25 is provided with two diametrically opposite substantially cylindrical pivoting lugs 32 the axes of which pass through the center of the spherical surface defined by the ball. The outside faces of these two lugs may be spherical but for convenience of manufacture and other reasons I prefer to make the outside faces cylindrical making the lugs of uniform thickness on their center lines and also forming a slight shoulder 34 between the lug and the ball.

The cradle 35 is provided with diametrically opposite seats or bearing surfaces 36 for the lugs 32 of the ball and at right angles to the axes of the bearings are integral pivotal lugs or trunnions 37, these trunnions being portions of a cylinder having a relatively very large radius as best seen in Fig. 2. The cradle is slotted as at 40 to form at right angles to the trunnions 37 a snug fit for the pipe 30 the slot extending from one trunnion to the other in order to provide a great angular movement of the pipe about its pivotal supports 32. The small projection or stiffening rib 42 which fits into the corresponding groove 43 in the semi-ball is merely for the purpose of strength, the cradle being rather thin at this point.

The swiveling ring 45 rides loosely in the cap or sleeve 18 having its principal bearing on the usual inturned lip 47 of the cap. The inner face of the cap and at least a portion of the inner cylindrical wall of the cap must be machined as it is desired that the ring 45 shall rotate easily within the cap. The ring is cylindrical on its outer surface 49 and is recessed as at 50 to provide seats or bearings for the trunnions 37 of the cradle. The inner surface 51 of the swiveling ring is of truncated cone shape.

Due to the very large relative size of the four pivoting lugs wear will be rather slight but it will be noted from the particular configuration that a very considerable amount of wear will not interfere with the efficiency of the joint, as when the bearings and the pivots wear down the radius line movement of the ball surface is not affected, consequently, there is no damage to the adjacent gasket surface which in other joints will be had due to the ball surface assuming an elliptical or eccentric movement.

While it might seem from looking at the drawings that a close fit was had between the space below the ball and the exit to the cap 18 such is actually not the case. There is a very considerable amount of space between the pipe 30 and the elongated parallel side and rounded end slot in the cradle and when the pipe is at a large angle to the cases there is a large exit opening adjacent the lugs 32 by reason of their cylindrical instead of spherical shape so that there is ample room for egress of even a fairly large cinder and in practice this free space is not only ample but considerably greater than exists in other types of double pivot ball joints.

The ball, it will be particularly noted, is cut away below its center line with a consequent omission of the friction rests with its sets up where a spherical ball rests with its lower radius surface against any kind of gasket whether of metal or otherwise. The neckless ball shown obviously eliminates all replacement of balls due to broken necks which is unfortunately of common occurrence because the bronze is limited to pipe size and when the neck breaks the ball is of course useless. In the present case should the pipe 30, which corresponds to the ordinary neck, break by any possible happening it is a very simple matter to screw in another section of pipe, the ball being undamaged by any damage to the pipe.

The cutting away of the ball below its center as described obviously allows greater angular movement of the pipe because if this portion were not cut away for the amount illustrated the edge of the ball would contact with the trunnion and thus limit angular movement in the direction of the cradle pivots.

What I claim is:

1. A ball joint of the type having a casing and a ball pivoted in a supporting member which is in turn pivotally mounted with respect to the casing so that the ball may have universal movement; characterized by said ball and member being pivoted to rock in directions at right angles to each other and the pivotal bearings of the supporting member being movable with respect to the casings.

2. A ball joint of the type having a casing and a ball pivoted in a supporting member which is in turn pivotally mounted with respect to the casing so that the ball may have universal movement; characterized by said ball and member being pivoted to rock in directions at right angles to each other and the pivotal bearings of the supporting member being rotatable within the casings.

3. A ball joint of the type having a casing and a ball pivoted in a supporting member which is in turn pivotally mounted with respect to the casing so that the ball may have universal movement; characterized by said ball and member being pivoted to rock in directions at right angles to each other and the pivotal bearings of the supporting member being rotatable and axially movable within the casings.

4. A ball joint of the type having a casing and a ball pivoted in a supporting member which is in turn pivotally mounted with respect to the casing so that the ball may have universal movement; characterized by said ball and member being pivoted to rock in directions at right angles to each other and the provision of a swiveling ring loosely mounted in the casings and in which the supporting member is pivoted.

5. In a ball joint, a pair of casings, a semi-ball having a plurality of pivoting lugs, a cradle having bearings for said lugs and having at right angles thereto a pair of trunnions, a ring rotatable in one of the casings and having a plurality of bearings for said trunnions, and means for holding said ball in its bearings.

6. In a ball joint, a pair of casings, a semi-ball having a plurality of pivoting lugs, a cradle having bearings for said lugs and having at right angles thereto a pair of trunnions, a ring rotatable in one of the casings and having a plurality of bearings for said trunnions, and means for holding said ball in its bearings and a fluid conveying means detachably secured to said ball.

7. In a ball joint, a pair of casings, a semi-ball having a plurality of pivoting lugs, a cradle having bearings for said lugs and having at right angles thereto a pair of trunnions, a ring loosely mounted in one of the casings and having a plurality of bearings for said trunnions, a gasket engaging said ball and an anti-vibration ring yieldably pressing said gasket against said ball.

8. A semi-ball for use in flexible pipe joints consisting of a portion of a sphere having a fluid admitting bore therein in the center of the spherical surface, a threaded opening in the larger plane face of the ball adapted to receive a section of pipe, and a plurality of diametrically opposed lugs cylindrical in cross section rising from said plane face, the axes of said lugs meeting the axis of the bore at the center of the spherical surface.

9. A cradle for use in a flexible pipe consisting of a member having an outer spherical surface recessed at diametrically opposite points to provide bearings for a pair of cylindrical pivoting lugs, a pair of trunnions extending from the spherical surface with their axes in the same plane as and at right angles to the axes of the cylindrical surfaces of said bearings, said cradle having an elongated slot therein, the major dimension of which lies in a line parallel to the axes of the trunnions.

10. In a pipe joint, a pipe fitting having an elongated portion providing a cylindrical chamber, a sleeve detachably secured to said fitting, a spring within said chamber, a ball having a zone-shaped spherical surface positioned within said chamber, a gasket engaging said ball, an anti-vibration ring positioned between and engaging said spring and said gasket, a ring loosely swiveled in said sleeve, a cradle pivoted in said ring and adapted to swivel therewith, and pivoting lugs on said ball adapted to engage said cradle whereby when the ball is twisted, the ball, cradle, and ring will rotate about the axis of the fitting and sleeve.

LEONIDAS D. WOODRUFF.